United States Patent [19]

Reed

[11] 4,117,734
[45] Oct. 3, 1978

[54] APPARATUS FOR INDICATING TRUE FURNACE DRAFT

[75] Inventor: Robert D. Reed, Tulsa, Okla.

[73] Assignee: John Zink Company, Tulsa, Okla.

[21] Appl. No.: 855,235

[22] Filed: Nov. 28, 1977

[51] Int. Cl.² .............................................. G01L 7/00
[52] U.S. Cl. ...................................... 73/756; 73/212
[58] Field of Search ................... 73/170 R, 212, 384, 73/385, 756, 188, 189

[56] References Cited

U.S. PATENT DOCUMENTS

| 2,271,863 | 2/1942 | Holm | 73/212 |
| 3,950,995 | 4/1976 | Marshall | 73/212 |

Primary Examiner—Donald O. Woodiel
Attorney, Agent, or Firm—Head, Johnson & Chafin

[57] ABSTRACT

Apparatus for attachment to a furnace system for indicating furnace draft, comprising piezometric chamber means for indicating true average atmospheric pressure, connected by a small diameter pressure tube to an inclined tube draft manometer, the second end of which is inserted through the wall of the furnace to the interior thereof. The piezometric chamber comprises a first vertical elongated pipe, closed at top and bottom, with a plurality of small diameter ports drilled near the base and evenly spaced around the circumference. A second pipe of smaller diameter is inserted co-axially through the bottom closure. The smaller pipe has an annular baffle plate attached about its outer surface inside of the larger pipe, to provide a narrow annular passage for air flow from the ports to and from the interior of the smaller second pipe.

4 Claims, 3 Drawing Figures

APPARATUS FOR INDICATING TRUE FURNACE DRAFT

BACKGROUND OF THE INVENTION

1. Field of the Invention

The invention lies in the field of furnace operation. More particularly, it concerns apparatus for indicating true draft of the furnace, which includes a piezometric pressure chamber for providing an average value of atmospheric pressure.

2. Description of the Prior Art

In the operation of furnaces, which are fuel fired, air must be caused to be drawn into the furnace in adequate quantity for burning of the fuel. In a great preponderance of cases, air entry is due to the draft (less than atmospheric pressure) within the furnace.

Regulation of draft is vitally necessary for proper and economical operation of the furnaces which serve a multitude of purposes. Therefore, there must be some means for measurement of furnace draft. It is standard practice to equip each furnace with an instrument known as a "draft gauge", which is, typically, an inclined manometer for measurement of the difference between the pressure inside the furnace at a selected point and atmospheric pressure. But, in windy conditions and, due to wind-induced variations in atmospheric pressure, for various reasons which are well known, it is impossible to accurately use the draft gauges when wind velocity exceeds 10 MPH (14.66 feet/second) and this wind movement velocity is close to the national average. For accuracy, the draft gauge is calibrated in units of 0.01 inch WC as a typical condition.

This invention provides an improved means for determining an average value of atmospheric pressure, against which to measure the differential pressure between the atmosphere and the inside of the furnace.

SUMMARY OF THE INVENTION

The invention involves a device which operates on the piezometric principle to create a true average atmospheric pressure for application to the atmospheric pressure end of the draft gauge, in avoidance of wind-induced variations in atmospheric pressure which, if changes occurred, would cause the gauge-indicated draft to fluctuate as the wind effect varied. Thus, in windy conditions, the draft gauge could no longer be of use as a draft indication. With the National average wind velocity of 10 MPH, the gauge-indicated draft can be in error by as much as 0.05 inch WC when gauge-indicated accuracy must be within 0.01 inch WC, plus or minus.

It is a primary object of this invention to provide an improved apparatus for determining the true value of furnace draft.

It is a further object of the invention to provide an improved piezometric chamber for determining true atmospheric pressure against which to measure the differential pressure between the inside of the furnace and the atmosphere.

These and other objects are realized and the limitations of the prior art are overcome in this invention by providing a piezometric pressure chamber which is designed with a vertically disposed pipe closed at top and bottom, comprising the chamber. There are a plurality of small diameter ports, spaced uniformly around the circumference of the pipe, near the bottom thereof, for contact between the inside of the chamber and the atmosphere. A second pipe of smaller diameter passes axially up through the bottom closure to a point near the top of the first pipe.

Intermediate between the top of the second pipe and the bottom of the first pipe is an annular baffle plate attached to the outside of the smaller pipe. The baffle is of lesser diameter than the first pipe providing a small annular passage between the outer edge of the baffle, and the inner wall of the first pipe, for the flow of air from and to the ports, and the interior of the second pipe. The pressure of air in the interior of the second pipe corresponds to the true value of atmospheric pressure.

The bottom end of the second pipe is connected by a small diameter tube to the atmospheric pressure end of a slant tube manometer. The second end of the manometer is connected by a small pipe through the wall of the furance to the interior thereof, where the measurement of draft is to be made.

BRIEF DESCRIPTION OF THE DRAWINGS

These and other objects and advantages of this invention and a better understanding of the principles and details of the invention will be evident from the following description taken in conjunction with the appended drawings, in which.

Figures 1, 2, 3:
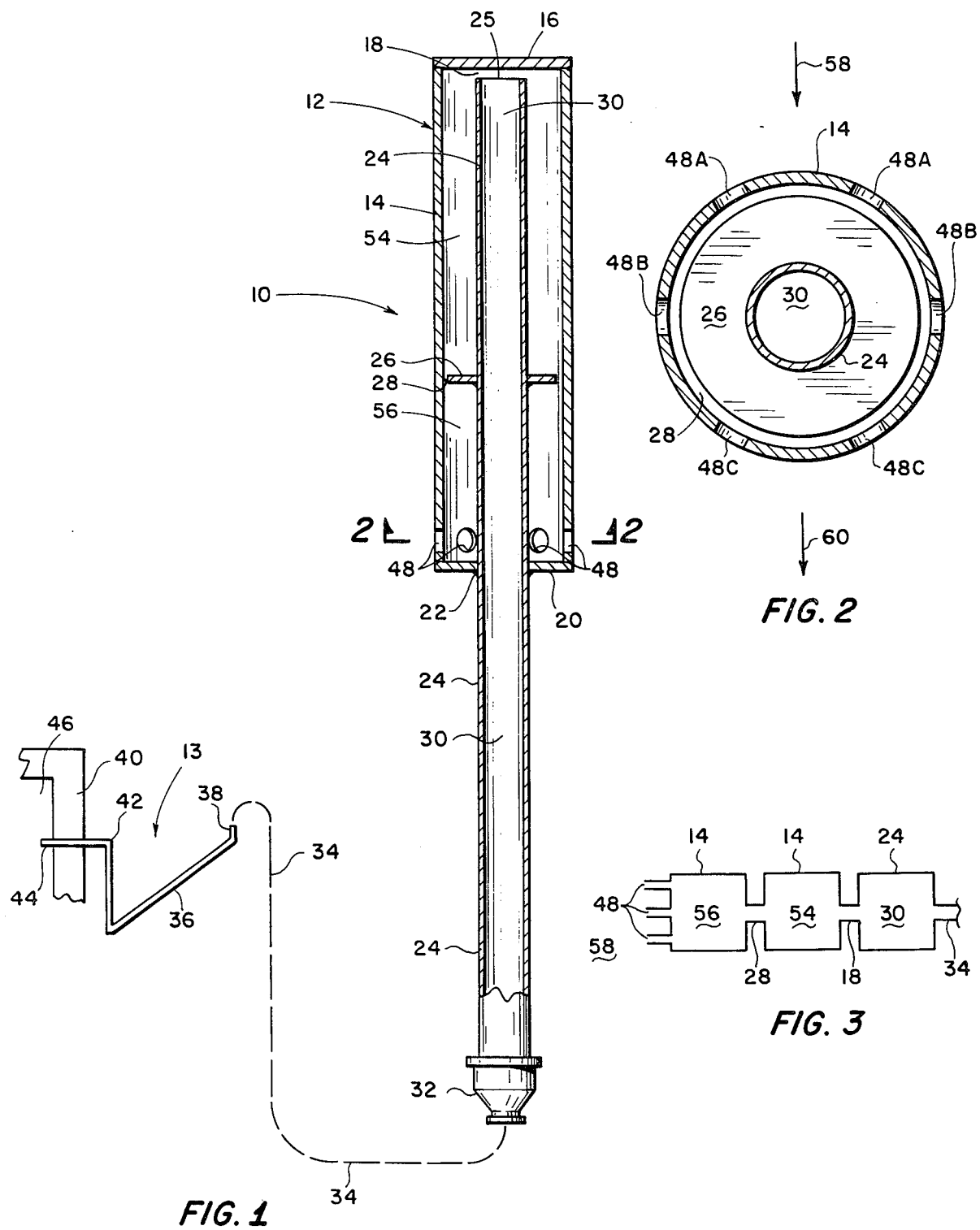
FIG. 1 illustrates in partial cross-section, the apparatus of this invention.
FIG. 2 illustrates in cross-section a view taken along the plane 2—2 of FIG. 1.
FIG. 3 illustrates the pressure filtering action of the apparatus of FIG. 1.

Referring now to the drawings, and, in particular, to FIGS. 1 and 2, there is illustrated one embodiment of the invention, indicated generally by the numeral 10.

It involves a piezometric chamber 12 for the determination of average atmospheric pressure, which is connected by a pressure tube 34 to a sloping arm manometer, or draft gauge 18. The second end 42 of the draft gauge is connected by pipe 44 which is inserted through the wall 40 of the furnace into the interior 46 thereof, where the draft is to be measured.

The chamber comprises a cylindrical pipe 14 of diameter D of the order of 3 inches, although it can be made larger or smaller, if desired. The chamber is closed at the top with a plate 16 and at the bottom with an annular plate 20. A smaller diameter pipe 24 of diameter $d$ (where $D = 3d$) is inserted co-axially through the opening in the base plate 20 of the chamber, and is welded in position 22. The pipe 24 passes through the major portion of the length of the pipe 14, leaving a narrow space 18 near the top plate 16.

Near the bottom end of the pipe 14 above the plate 20, is a plurality of small diameter ports 48, which are spaced symmetrically around the circumference of the pipe 14.

There is an annular plate 26 fastened by welds or other means to the outer surface of the smaller pipe 24, at a selected position between the top of the small pipe 24 and the bottom plate 20 of the outer pipe 14. Thus, there are substantially three separate volumes. The first is an annular volume 56 between the outer and the inner pipes and between the baffle 26 and the plate 20. There is a second annular volume 54 between the outer and inner pipes between the baffle 26 and the top plate 16. These are connected by a narrow annular passage 28 between the baffle and the outer pipe 14.

There is a third volume 30 comprising the inner volume of the second pipe 24. This third volume is connected to the second volume by means of a passage 18 between the top of the second pipe and the top plate 16, which can be made of selected dimension.

Referring for a moment to FIG. 3, there is shown a series of three volumes 56, 54 and 30. 56 is open to the atmosphere 58 through a plurality of parallel ports 48. The volume 30 is connected to a small diameter pressure tube 34 to the manometer. It will be clear that any variation of the atmospheric pressure 58 on the outside of the ports 48 will be reflected in a variation of pressure inside the space 56 due to alternating flow of air through the ports 48 into and out of the space 56. Obviously, the variation in pressure in the space 56 will be less than that of the atmosphere 58 due to the filtering effect of the passage 48 and the volume 56.

Similarly, the variation in pressure in 56 will be reflected also into the pressure in the adjacent space 54 through the passage 28 because of an additional stage of filtering due to the passage 28 and the volume 54.

There will also be a reflection in the pressure into the space 30, due to variations in pressure in 54, but of still lesser amplitude, due again to the filtering effect of the passage 18, in connection with the volume of space 30. Consequently, because of the three stages of low pass filtering, the wide variations in atmospheric pressure at 58 due to the rapid and changeable wind velocity and direction, will be filtered in three stages by the time it reaches the final chamber 30. Therefore, there will be very small, if any, variation in pressure in 30, which will reflect a true average value of atmospheric pressure. This pressure is then communicated by the pressure lines 34 to the atmospheric end 38 of the manometer 13.

The improvement in this design of the piezometric chamber differs from prior art apparatus, particularly, in the division of the total volume into three chambers, as indicated in FIG. 3, so that a truer value of atmospheric pressure is represented by the pressure in the bottom end of the pipe 24, which is communicated to the manometer 13, and thus, to the differential pressure between the space 46 inside of the furnace wall 40 as read by the open end 44 of the pipe 42, compared to the average value of pressure indicated by the pressure line 34. This pressure differential will be a true value of the magnitude of the draft in the space 46 inside of the furnace wall 40.

FIG. 2 shows a cross-section of the vessel 12 across the plane 2—2 of FIG. 1. This clearly illustrates the presence of the narrow annular passage 28 between the flange or baffle 26, and the outer pipe 14.

The diameter of the ports 48 should be small so that the total area of port opening is small compared to the diameter of the pipe 14. Similarly, for best filtering effect the area of the annular passage 28 should be small compared to the area of the outer pipe 14, etc.

The piezometric chamber 12 should be located in an open area free from large structures, buildings, or trees, for free wind movement over the chamber in all directions. The elevation of the chamber should be of the order of 6 feet above grade.

As is well known, as wind comes in contact with a vertical or transverse surface, and according to the angle of the wind with respect to the surface, the atmospheric pressure adjacent to the surface stricken by the wind is increased, by at least a portion of the $V^2/2g$ pressure head of the wind, to some degree. At the downwind or lee side of the vertical surface, pressure is decreased to some condition less than the atmospheric pressure, according to Bernoulli's theory, and based on wind velocity.

For example, consider the horizontal cross-section of FIG. 2 and wind coming from the direction of arrows 58. The ports 48A near the top will be nearest to the wind flow 58, and, because of the wind strike, will have a pressure greater than atmospheric, by the amount of the velocity head effect of the wind. Thus, air would be pressure-driven through the ports 48A to the interior of the space 56. Simultaneously, at the downwind side of the chamber in accordance with arrow 60, there would be a reduced pressure, less than atmospheric by the negative velocity head of the wind, and there would be an outflow of air from the space 56 through the ports 48C. The simultaneous entry-exit of air causes the pressure within the space 56 to be relatively unchanged, except for minor flow disturbances, due to the passage of air in and out. The effects of flow disturbance of pressure are located in the space 56 and are isolated from the spaces 54 and 30 by the baffle 26 creating constriction 28 and 18, respectively. The annular passage 28 is of small area, generally of the order of 0.5 square inch, preferably, and is specified as of the order of 1/15th of the internal area of 14, plus or minus a few percent.

In a similar manner, the diameter of the ports 48 are small but are large enough so that rain water running down the exterior of the pipe 14, or windblown to entry to the ports, cannot accumulate to a degree such as to cause water blockage of the ports 48. The area of each of the ports can be in the range of 1/67th the area of pipe 14, to 1/700 of the internal area of pipe 14. A minimum number of four ports is required, but a preferred number is six ports, with all ports equally spaced around the outer periphery of the pipe 14.

While the invention has been described with a certain degree of particularity, it is manifest that many changes may be made in the details of the construction and the arrangement of components. It is understood that the invention is not to be limited to the specific embodiments set forth herein by way of exemplifying the invention, but the invention is to be limited only by the scope of the attached claims, including the full range of equivalency to which each element or step thereof is entitled.

What is claimed:

1. In a furnace system, apparatus for indicating true furnace draft, comprising;
   (a) piezometric chamber means for indicating a true average value of atmospheric pressure;
   (b) an inclined tube draft manometer, the atmospheric pressure end or first end connected to said piezometric chamber, the second end connected to a tube passing through the wall of said furnace into the interior thereof;
   and wherein said piezometric chamber comprises;
   (c) an elongated vertical first pipe of a first internal diameter D, closed at the top and bottom, a plurality of small diameter ports drilled through the wall, near the bottom end thereof, uniformly spaced circumferentially;
   (d) a second pipe of smaller internal diameter d, inserted co-axially through the bottom closure of said first pipe, and extending almost to the top thereof;
   (e) an annular baffle plate of less diameter than D, attached to said smaller pipe, inside of said chamber, providing a narrow annular passage for flow of air from and to said ports and the interior of said second pipe; and (f) tubular means connecting the bottom end of said second pipe to said first end of said manometer.

2. The apparatus as in claim 1 in which D/$d$ is of the order of 3.

3. The apparatus as in claim 1 in which said chamber is positioned in the outdoors, spaced from structures and at an elevation of the order of 6 feet.

4. The apparatus as in claim 1 in which the cross-sectional area of each port is in the range of 1/70 to 1/700 of the internal area of said first pipe.

* * * * *